United States Patent Office

3,345,414
Patented Oct. 3, 1967

3,345,414
PREPARATION OF TETRAKIS(DIFLUORO-AMINO)BUTANE
Richard P. Rhodes, Newark, N.J., assignor to Esso Research and Engineering Company, a corporation of Delaware
No Drawing. Filed Jan. 27, 1960, Ser. No. 5,071
7 Claims. (Cl. 260—583)

The present invention relates to the preparation of 1,2,3,4-tetrakis(difluoroamino)butane.

A considerable amount of work has been undertaken in recent times to prepare better oxidizing agents for chemical fuels, such as boron. A number of attempts have been made to prepare compounds which have a high $NF_2/C$ ratio, but these have been unsuccessful. For instance, it was found that while two difluoroamino groups could be added to butadiene under atmospheric pressure at about room temperature by contacting it with tetrafluorohydrazine, it was not known how to add two more difluoroamino groups to obtain a compound having an $NF_2$ attached to each carbon atom.

An object of the present invention is to provide a suitable method for making 1,2,3,4-tetrakis(difluoroamino)-butane. Another object of the invention is to provide a method in which the aforementioned compound may be prepared in large yields.

It has now been discovered that 1,2,3,4-tetrakis(difluoroamino)butane can readily be prepared from bis-(difluoroamino)butene and tetrafluorohydrazine. Excellent yields of the "tetrakis compound'" are obtained when the reaction is carried out at elevated temperatures and relatively high pressures.

In accordance with the present invention, 1,2,3,4-tetrakis(difluoroamino)butane is made by reacting 1 mole of a bis-(difluoroamino) adduct of butadiene with about 1 or 2 to 10, preferably 5 to 10, moles of tetrafluorohydrazine at temperatures substantially above room temperature and under at least 5 atmospheres pressure. The bis-(difluoroamino)butene compound, e.g. 1,4-bis-(difluoroamino)-2-butene or 1,2-bis-(difluoroamino)-3-butene, is reacted with an adequate amount of tetrafluorohydrazine to add two $NF_2$ groups to the carbon atoms which carry the double bond. The pressure and temperature in the reaction zone are highly important and must be carefully regulated in order to insure optimum yields for a given reaction time. Moreover, the product is somewhat heat sensitive and tends to decompose when maintained for long periods of time at temperatures exceeding about 150° C. While reaction times of 5 to 20 hours can be employed at reaction temperatures of 90 to 150° C. without experiencing any noticeable decomposition of the desired product, such reaction periods cannot be used at higher temperatures, e.g. 160 to 200° C. without a substantial or total loss of the tetrakis product. Broadly speaking, the reaction time may vary from about 10 minutes to 20 hours. Also pressures ranging up to 300 atmospheres or more may be employed. It has been noted that the best yields are obtained by operating at moderately high temperatures, e.g. 90 to 130° C. under pressures of 10 to 40 atmospheres for about 1 to 8 hours. Under the foregoing preferred conditions, yields of 50%, 60% or more of 1,2,3,4-tetrakis(difluoroamino)butane are obtained.

Optionally, an inert diluent, preferably a normal perhalogenated liquid hydrocarbon boiling in about the same range as the adduct reactant, may be employed to reduce the hazardousness of the reaction. Generally, up to 80 wt. percent of diluent based on the adduct can be used, although it will be found that about 20 to 60 wt. percent is a practical concentration for the diluent. Suitable organic and inorganic diluents include $C_6$ to $C_{20}$ paraffins, such as hexane or decane, and $C_1$ to $C_{20}$ perfluorinated or perchlorinated liquids, such as perfluorinated kerosene and carbon tetrachloride.

The bis-(difluoroamino) adduct of butadiene used in the practice of the invention may be either the 1,4-bis-(difluoroamino)-2-butene, 1,2-bis-(difluoroamino)-3-butene or mixtures thereof. These compounds may be generically described as bis-(difluoroamino)-2- to 3-butene. A typical mixture of these two substances in equilibrium at 100° C. is 15 wt. percent of the trans-1,4-bis-(difluoroamino) adduct, 75 wt. percent of the cis-1,4-bis-(difluoroamino) adduct and 10 wt. percent of the 1,2-bis-(difluoroamino) adduct of butadiene. The purity of the reactants, i.e. tetrafluorohydrazine and the butadiene adduct, is not critical as long as they do not contain any substances which noticeably interfere with the desired reaction. However, in order to insure high quality product and to facilitate separation of the tetrakis product from the reaction mixture, it is recommended that substantially pure reactants, e.g. at least 98% pure, be employed in the process.

A substantial excess of the tetrafluorohydrazine reactant is preferably used in order to increase the reaction rate. Since this reactant is normally a gas it is easily separated from the reaction product and recycled to the reaction zone in a continuous process. The tetrafluorohydrazine itself, or a mixture of it and an inert gas, such as nitrogen, is employed to regulate the pressure in the reaction zone. The tetrafluorohydrazine reactant becomes quite soluble in the liquid phase in the reactor. It is believed that the reaction takes place in the liquid phase in the reaction zone, although it may be that it occurs in the vapor phase above the liquid.

The tetrakis product may be separated from the reaction mixture by any suitable means, such as distillation. For example, any unreacted gases in the reaction vessel may be vented to the atmosphere and the liquid which contains the desired product may be collected and transferred to a distillation unit equipped with means for effecting efficient rectification. Besides the 1,2,3,4-tetrakis (difluoroamino)butane, the liquid reaction mixture generally contains minor amounts of the 1,2- and 1,4-bis-(difluoroamino) adducts. The 1,2-bis adduct has a boiling range substantially below that of the tetrakis compound and thus is easily separated from the reaction mixture by distillation under reduced pressure. The 1,4-bis adduct is more difficult to separate and generally requires the use of high vacuum, e.g. less than 10 mm. of mercury absolute pressure, and an efficient fractionating column. The tetrakis compound, which is a colorless liquid, boils at about 170 to 180° C. under atmospheric pressure. Other conventional separation techniques, such as the use of selective solvents, can be used to recover the product.

The tetrakis compound prepared in accordance with the present invention is highly useful in rocket propellant compositions. A suitable propellant containing 1,2,3,4-tetrakis(difluoroamino)butane is as follows.

| Component: | Wt. percent |
|---|---|
| 1,2,3,4-tetrakis(difluoroamino)butane | 33.51 |
| Tetranitromethane | 35.57 |
| Boron | 0.92 |
| Natural rubber binder | 30.00 |

The above propellant composition has a relatively high specific impulse. The tetrakis compound may also be mixed with liquid oxygen in a 1 to 2 wt. ratio to make a suitable liquid propellant which can be used in conventional rockets employing that type of propellant. The product prepared by the process of the present invention may be pyrolyzed to obtain nitrogen, boron trifluoride and hydrogen fluoride, all of which have known utilities. It may also be used as an intermediate in the preparation of amines, nitriles, etc. or as an explosive.

The following examples are given to afford a better understanding of the process of the present invention.

*Example 1*

A bis-(difluoroamino)butene adduct mixture, used to prepare the tetrakis compound, is produced by passing 1 mole of tetrafluorohydrazine and 1 mole of 1,3-butadiene through a stainless steel tube heated to 200° C. and under atmospheric pressure. A mixture of bis-1,2 and -1,4-difluoroamino adducts is obtained. One mole of this bis adduct mixture is transferred to a 15 cc. stainless steel pressure bomb and reacted with about 5 moles of tetrafluorohydrazine under about 28 atmospheres pressure at 105° C. for 6 hours in a mixed phase. The feed consists of 28 wt. percent 1,2-bis-(difluoroamine)-3-butene, 9% trans-1,4-bis-(difluoroamino)-2-butene and 63 wt. percent cis-1,4-bis-(difluoroamino)-2-butene. Upon completion of this reaction the liquid components are separated by efficient fractional distillation under about 5 mm. of mercury absolute pressure. An analysis of the liquid product showed that it contained 57.2 wt. percent 1,2,3,4-tetrakis(difluoroamino)butane, 2.7 wt. percent of the 1,2-bis-(difluoroamine)-3-butene and 7.1 and 33 wt. percent, respectively of the trans- and cis-1,4-adducts.

*Example 2*

The previous example is repeated under the following conditions and in the presence of a perfluorinated kerosene diluent. One mole of the same adduct mixture used above is introduced into the stainless steel bomb as a 50 wt. percent solution in perfluorinated kerosene and there it is reacted with about 2.5 moles of tetrafluorohydrazine in a mixed phase for 16 hours at 90° C. and under 13.6 atmospheres pressure. The unreacted tetrafluorohydrazine is vented and the liquids are separated by fractional distillation under 5–10 mm. of mercury absolute pressure. The composition of the $NF_2$-containing compounds is as follows.

| Component: | Wt. percent |
|---|---|
| 1,2,3,4-tetrakis(difluoroamino)butane | 76 |
| Trans-1,4-bis-(difluoroamino)-2-butene | 2 |
| Cis-1,4-bis-(difluoroamino)-2-butene | 7 |
| 1,2-bis-(difluoroamino)-3-butene | 15 |

The data show that employing relatively mild conditions for long periods of time large yields of the tetrakis product can be obtained. The inert diluent serves to reduce the possibility of explosion during the reaction period.

The temperature is very important since high temperatures, e.g. above 200° C., decompose any product formed and low temperatures, e.g. 30° C. result in the formation of little or no tetrakis compound. Similarly, the pressure employed is critical where substantial yields are desired. For example, very little, if any, product is obtained at atmospheric pressure while good yields are gotten at about 10–15 atmospheres.

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. Process for making 1,2,3,4-tetrakis(difluoroamino)butane which comprises contacting bis-(difluoroamino)butene with tetrafluorohydrazine at temperatures in the range of 30° C. to 200° C., under pressures of at least 5 atmospheres for about 1 to 20 hours to form 1,2,3,4-tetrakis(difluoroamino)butene.

2. Process for making 1,2,3,4-tetrakis(difluoroamino)butane which comprises contacting 1 mole of bis-(difluoroamino)butene with 1 to 10 moles of tetrafluorohydrazine at 90 to 150° C. under 10 to 300 atmospheres of pressure for about 1 to 20 hours in a reaction zone and recovering 1,2,3,4-tetrakis(difluoroamino)butane from the reaction mixture.

3. Process according to claim 2 in which there is up to 80 wt. percent of an inert diluent, based on the bis-(difluoroamino)butene, in the reaction zone.

4. Process according to claim 2 in which the reaction time is 1 to 8 hours.

5. Process according to claim 2 in which the mole ratio of tetrafluorohydrazine to bis-(difluoroamine)butene is about 5 to 10:1.

6. Process for making 1,2,3,4-tetrakis(difluoroamino)butane which comprises contacting 1 mole of a mixture of 1,2-bis-(difluoroamino)-3-butene and 1,4-bis-(difluoroamino)-2-butene with about 1 to 10 moles of tetrafluorohydrazine at 90 to 130° C. under 10 to 40 atmospheres pressure for 1 to 20 hours in a reaction zone, and recovering substantially pure 1,2,3,4-tetrakis(difluoroamino)butane from the liquid reaction mixture.

7. Process for making 1,2,3,4-tetrakis(difluoroamino)butane which comprises contacting 1 mole of bis-(difluoroamino)-2- to 3-butene with about 2 to 10 moles of tetrafluorohydrazine at about 90 to 130° C. under pressures of 10 to 40 atmospheres for about 1 to 8 hours in a reaction zone, withdrawing the reaction mixture from said zone and separating the unreacted tetrafluorohydrazine and butene from the 1,2,3,4-tetrakis(difluoroamino)butane in the reaction mixture.

No references cited.

CHARLES B. PARKER, *Primary Examiner.*

R. L. CAMPBELL, L. D. ROSDOL, *Examiners.*

J. W. WHISLER, *Assistant Examiner.*